Figure 1:
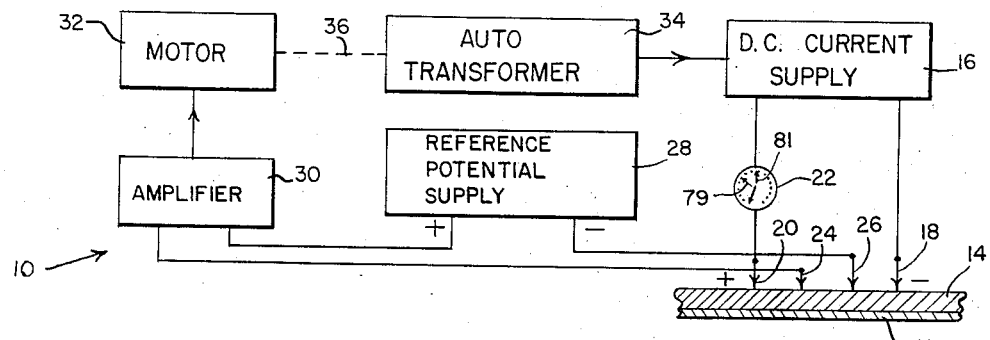

Sept. 30, 1958     M. DAVIDSON ET AL     2,854,626

PLATING THICKNESS INDICATOR

Filed Dec. 31, 1954

INVENTORS
MARTIN DAVIDSON
NICHOLAS S. RAHAL

BY *George Sipkin*

ATTORNEYS

2,854,626
Patented Sept. 30, 1958

United States Patent Office

2,854,626

PLATING THICKNESS INDICATOR

Martin Davidson, Bethesda, and Nicholas S. Rahal, Rockville, Md., assignors to the United States of America as represented by the Secretary of the Navy Application December 31, 1954, Serial No. 479,259

8 Claims. (Cl. 324—64)

(Granted under Title 35, U. S. Code (1952), sec. 266)

The invention described herein may be manufactured and used by or for the Government of the United States of America for governmental purposes without the payment of any royalties thereon or therefor.

The present invention relates to the electrical measurement of plating thickness on a body, and more particularly, to an improved method and apparatus for measuring and indicating the quantity of plating material on an electrically conductive metal base.

In the manufacture of components having one or several layers of plated metal thereon, such as waveguides or tubing, it is desirable from the standpoint of quality control or assurance of proper operation to accurately measure the thickness or quantity of plated material on the base. There are various known methods for measuring the plating thickness on a metal base and such methods are in use. However, the known methods have certain limitations or disadvantages which render their use either impractical in routine applications or inoperative in the measurement of many plated metals. These methods, which operate on a static magnetic, eddy current, or a slow neutron irradiation principle, generally require that the measured materials have magnetic properties with some requiring uniform magnetic properties, and/or are expensive to construct, complicated, and extremely slow in operation.

As a result, it has become customary in measuring certain plated materials to simply select certain components from the production line, remove a small portion of the plated metal from a selected component by cutting or otherwise and then mechanically measuring the plating thickness. Besides being expensive in that the component is destroyed, this method provides only an approximation of the plating thickness of the remaining unmeasured components, and as such, is unsatisfactory.

One of the prime objects of the instant invention is the provision of a novel method and apparatus which operates to nondestructively measure the plating thickness of a specimen.

Another object of the present invention is to provide an apparatus for accurately measuring the plating thickness of any electrically conductive metal combination.

A further object of the invention is the provision of a method and apparatus for measuring the plating thickness of a combination metal irrespective of its magnetic properties.

Still another object is to provide a method and apparatus for selectively measuring the plating thickness of one or several metals plated on a metal base and to measure said plated metals by taking measurements from either the plated or unplated surface of the metal base.

A still further object of the invention is the provision of an apparatus which operates atuomatically to provide a direct numerical indication of the plating thickness of a plated metal and which holds said indication after completion of the measurement.

Another object of the invention is to provide a simple, direct reading, plating thickness indicator which is ideally suited for routine applications to provide quick and accurate measurements.

Figure 2:
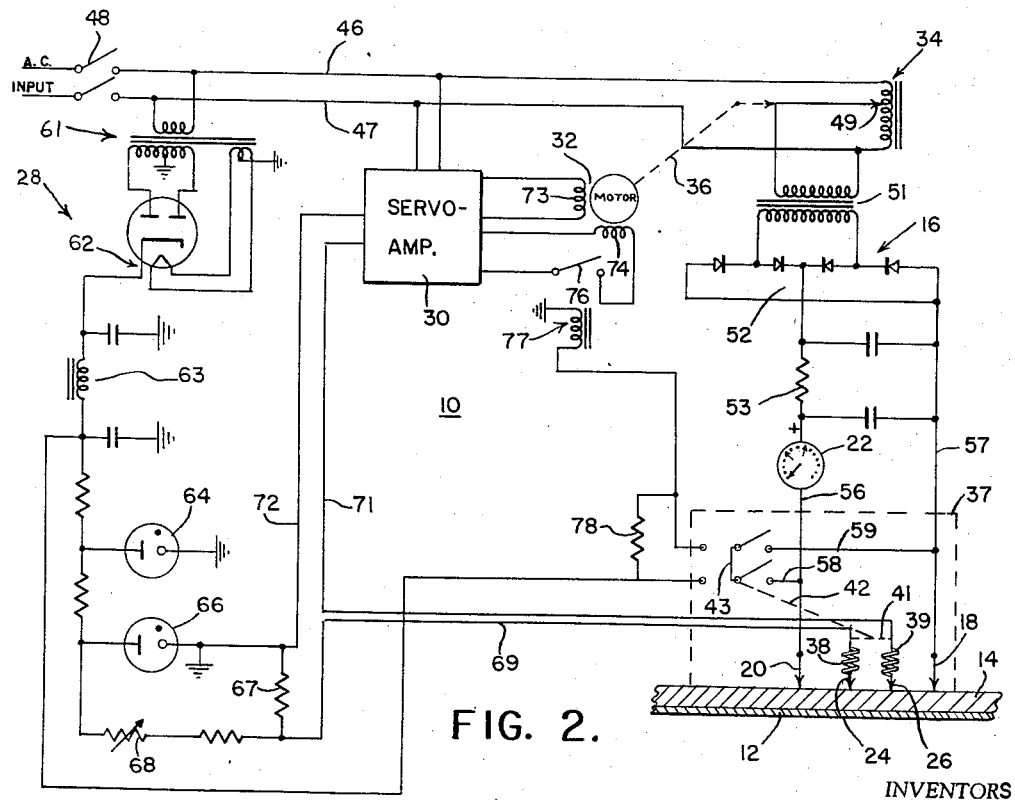

Other objects and may of the attendant advantages of this invention will be readily appreciated as the same becomes better understood by reference to the following detailed description when considered in connection with the accompanying sheet of drawing wherein:

Fig. 1 is a block diagram showing a plating thickness indicator constructed in accordance with the teachings of the instant invention; and Fig. 2 is a schematic showing of a preferred embodiment of the instant invention.

Referring now to the drawing wherein like reference characters designate like or corresponding parts throughout the several views, there is shown in Fig. 1 a block diagram view of a plating thickness indicator 10 for selectively measuring the thickness or quantity of one or several layers of plating material 12 on a metal base 14. As illustrated in this figure, metal base 14, which may be formed of any electrically conductive metal, has only a single layer of plating material 12 thereon. It will be obvious that in line with the teachings of the instant invention, several layers of plating material may be present upon the surface of metal base 14 and that the apparatus will operate automatically to measure and give a direct indication of any one of the layers. The only limitations in this measurement are that the specimen, both plated and base metals, must be of electrically conductive material and that should a plurality of layers of any metal or metals having the same or different conductivity values be placed on a metal base, a single measurement would provide an indication of the effective total thickness or quantity of all the layers whether of like or different conductivity-values.

To measure the plating thickness of a component or specimen, a known amount of direct current is passed from a direct current source 16 through a pair of metallic probes or electrodes 18 and 20, which for reference purposes will hereinafter be termed the current probes. An indication of this supplied current is provided by an indicating meter 22 comprising a suitable ammeter or the like positioned in the current supply line of the positive potential probe 20. Desirably, meter 22 is provided with suitable indicia calibrated in terms of thickness units for reasons which will hereinafter become apparent.

Positioned in line with and spaced between current probes 18 and 20 is a second pair of metallic probes 24 and 26, respectively. These probes are similar to probes 18 and 20 and will, for reference purposes, be termed potential probes. Probes 24 and 26 function to pick up the potential difference existing between the potential probe-defining points in the specimen due to the current flow existing between current probes 18 and 20. By measuring this potential difference, the conductance of the specimen, which is a function of the thickness and conductivity of the metal comprising the specimen, can be determined. Thus, if the conductance of the metal base and plating material is known; the current is known, and if the current is laminar throughout the specimen, the thickness of the plating material may be measured. It is to be noted that laminar or multiple-dimensional current flow is obtained by making the current probe spacing greater than the thickness of the waveguide wall.

Through the equation:

$$E = \frac{I}{2r\pi t} \ln \frac{r_2 r_4}{r_1 r_2} \qquad (1)$$

where

E is the potential difference in volts,
I is the current in amperes, $r$ is the conductivity in reciprocal microhm-centimeters,
$t$ is the thickness of the sheet in inches,
$r_1$ is the distance in inches from the current source to the potential point nearest it,
$r_2$ is the distance from the current sink to the potential point nearest the current source,
$r_3$ is the distance from the current sink to the potential point nearest it,
$r_4$ is the distance from the current source to the potential point nearest current sink and where $ln$ is the logarithm taken to the base $e$, a potential plot of the potential difference may be obtained between two points in an infinite plane current sheet generated by a source and a sink of equal strength. Through this plot, an ideal probe separation or spacing for a particular metal thickness may be obtained. In one embodiment, wherein the thickness of the specimen was .037 inch, it was found that a current probe spacing of 2 inches and a potential probe spacing of 1 inch operated quite satisfactorily.

Potential probes 24 and 26 are placed in series with a D. C. reference potential supply or source 28 and a servo-loop comprising servo-amplifier 30 and motor 32. This arrangement is such that the reference potential source 28 and the probes 24 and 26 are connected in opposed relation to current probes 18 and 20 so that the reference potential of source 28 and the potentials developed across probes 24 and 26 by the current flowing thereacross act to neutralize or "buck-out" each other. Any difference potential existing between the developed and reference potentials are amplified in servo-amplifier 30 to operate motor 32 in a direction determined by the instantaneous polarity of the difference potential. Mechanically connected to and controlled by motor 32, as by a mechanical arm indicated at 36, is an auto-transformer 34 which is electrically connected in the input power line of direct current power source or supply 16. By automatically adjusting auto-transformer 34 in accordance with the difference potential, the supply of current fed to current probes 18 and 20 and thus the potentials developed across probes 24 and 26, which are proportional to the current fed to probes 18 and 20, may be balanced with the reference potential of source 28.

Consequently, it will be apparent that by initially supplying a current to probes 18 and 20 which is dependent upon the conductance of metal base 14, and adjusting meter 22 through resistance 68 to provide an indication of this current value, which may serve as a zero reading any current variation supplied to probes 18 and 20 for balancing the potential across probes 24 and 26 and the reference potential from supply 28 will be indicated upon meter 22. Since this additional current is due to the presence of the plating material on metal base, the meter indication will be a measure of the quantity or thickness of the plated material. The latter is true since the laminar current flow through the plated material is proportional to its thickness and the potential across probes 24 and 26 is proportional to the current flow. It is noted that reference is made herein to quantity of plated material and also to thickness of plating material. The two may be but are not necessarily synonymous inasmuch as the conductance of a layer of plating material is a function of its thickness as well as its density. The density of the material depends upon the grade of metal or method of plating employed. In the measurement of plating thickness, these factors are usually known and the instrument adjusted therefor.

Referring now to Fig. 2, there is shown a specific circuit arrangement of a preferred embodiment of plating thickness indicator 10. Included in the arrangement and indicated in the drawing by the dotted lines 37 is a probe assembly which serves to house the current and potential probes 18, 20, 24 and 26. While not specifically shown in the drawing, it will be apparent that the probe assembly may comprise a small, portable, box-like container having a plurality of electrical wires leading therefrom to a stationary unit containing the remaining components of the apparatus. Each of the probes protrudes outwardly from the assembly with the current probes 18 and 20 being positioned in fixed relation with the assembly housing.

Desirably, the potential probes 24 and 26 while fixed against relative lateral movement, are spring-biased outwardly by a pair of compression springs 38 and 39, respectively, and project slightly beyond the current probes so that upon pressing the assembly against a component or specimen to be measured, a good electrical contact between the probes and component is assured. Mechanically connected to the spring-biased probes 24 and 26, and electrically insulated therefrom as by a bar of rigid insulating material indicated at 41, is a link 42 which is attached at its opposite end to a double-pole double-throw switch 43. The arrangement is such that when the probes 24 and 26 are biased inwardly by a manual pressure against base 14, the switch 43 is operated to a first position and when the probes are biased in their normal outward position, the switch is operated to a second position. The switch, as will soon become apparent, serves to operate a meter hold circuit whenever a measurement is completed.

Power for the probe assembly and the associated apparatus is taken from an A. C. input supply and fed to a pair of power lines 46 and 47 through a power disconnect switch 48. Connected across lines 46 and 47 is the auto-transformer 34. As is well known, such transformers are conventionally provided with a single winding and operate to provide a voltage or current output which is proportional to the instantaneous position of a tap 49 in movably fixed engagement with the winding.

The alternating current output of auto-transformer 34 is taken through a power transformer 51 of the D. C. power supply 16 and is converted to a pulsating direct current by a conventional full wave selenium rectifier circuit 52 comprising a plurality of four selenium rectifiers. This pulsating direct current is taken from the rectifier circuit and passed through a capacitive input filter circuit 53 for smoothing the current peaks of the pulsating current so as to provide a direct current. Connected across the filter circuit is a pair of leads 56 and 57, one of which is connected to probe 18 and the other is connected to probe 20. Desirably, meter 22 is placed in line 22 for indicating the flow of current through lines 56 and 57 and thus probes 18 and 20. A pair of leads 58 and 59 are also connected, on one end, to said D. C. current leads 56 and 57 respectively. The other ends of leads 58 and 59 are connected to a pair of terminals on switch 43 such that upon the switch being placed in its second position, lines 58 and 59 short-circuit the output of filter circuit 53.

A second power transformer 61 is connected across the A. C. input supply leads 46 and 47. Transformer 61 supplies an A. C. current to the reference potential supply 28 comprising a conventional full wave rectifier circuit 62 including a duo-diode electronic tube and a capacitive input filter circuit 63. Desirably, the reference potential supply further includes a voltage-regulator tube 64 and a voltage-reference tube 66. These units are conventional and operate in a known manner to provide a controlled voltage potential across a precision load resistor 67 placed in the output of supply 28. Preferably, an adjustable resistor or rheostat 68 is placed in series with the output to compensate the potential output of the supply for any variation in component characteristics which may occur upon the replacement of a component such as the reference tube 66.

The reference potential developed in supply 28 is connected in series relation with probes 24 and 26 through line 69 and in series with servo-amplifier 30 through lines 71 and 72. It will be apparent that by connecting the probes in this manner, the reference potential in supply 28 and the potential developed across probes 24 and 26 are in "bucking" relation and that the difference of these potentials is applied to servo-amplifier 30.

Servo-amplifier 30 is conventional in construction and operates to amplify the difference signal an amount sufficient to control the operation of motor 32 through its field winding 73. Moreover, depending upon the polarity of this difference signal, the amplifier acts to control the direction of motor movement. Suitably connected to the armature of motor 32 is a mechanical link 36. The link has its opposite end connected to the variable tap 49 of auto-transformer 34 for driving the same in accordance with the movement of motor 32.

In order to stop movement of motor 32 and hence, the position of tap 49 whenever a measurement has been completed, the second field winding 74 of motor 32 is connected to the servo-amplifier 30 through a contactor 76 of a relay 77. The winding of relay 77 is connected on one end to ground and on its other end to the unregulated D. C. source of reference potential supply 28 through switch 43. Connected across switch 43 and in the line of supply 28 and relay 77 is a voltage-dropping resistor 78. The arrangement is such that upon placing switch 43 in its first position, i. e., to the left in Fig. 2, supply 28 is connected by switch 43 directly through the relay winding to ground. The current flow through the relay in this direct circuit is sufficient to actuate contactor 76 to its circuit closing position. On the other hand, when switch 43 is in its second position, i. e., to the right in Fig. 2, parallel resistor 78 is placed in series with relay 77 so that the current in this circuit is reduced to a point that it is insufficient to actuate the relay. Consequently, contactor 76, which is biased to its open position, opens the circuit to winding 74 of motor 32 for stopping the same.

Assuming that the disconnect switch 48 is closed and the circuit is energized, the operation of the plating thickness indicator in measuring a single thickness of plating on a metal base 14 is as follows: the conductance of the metal base is determined either by a calculation based upon the thickness and conductivity of the base material, by means of a Kelvin resistance bridge or by a prior reading of a sample of known thickness taken with the plating thickness indicator before deposition of plating material. The current in the probes 18 and 20 being adjusted through 49 by resistor 68. This reading is expressed in thickness units corresponding to the calibration of meter 22 which has been calibrated in thickness units corresponding to the relative conductivity of base and plated materials. The meter is then marked as at 79 to indicate this reading which serves as a "zero" for the plating thickness measurement. A mark 81 may also be placed on meter 22 to indicate the desired thickness of plated material.

After these initial adjustments, the probe assembly is manually pressed against the plated or unplated side of the component or specimen under measurement. When this occurs, switch 43 is actuated to its first position by link 42 for placing the unregulated D. C. supply of supply 28 in series with relay 77. This actuates contactor 76 and closes the circuit of motor winding 74. Meanwhile, potential probes 24 and 26 have a potential developed thereacross due to the current flow in the component between probes 18 and 20 and have a regulated potential applied thereacross from reference potential source 28. Any difference potential existing across the probes, due to the current flow through the plating metals, is applied to servo-amplifier 30 for operating control motor 32. Movement of motor 32 acts to vary the position of auto-transformer tap 49 through line 36. Since the tap movement will be correcting or balancing in nature, the output of auto-transformer 34 will be appropriately varied to change the current flow through probes 18 and 20. Inasmuch as the necessary change in current is due to the thickness of plating metal on metal base 14, the change or indication of meter 22 of this current will be a direct indication of plating thickness. With a marking of the proper indication for the base metal on meter 22, this change of indication is readable directly.

It is to be noted that as the measurement is completed and the probe assembly removed from the component, switch 43 will be actuated to its second position. This operates through relay 77 to deenergize motor 32 and to short-circuit D. C. current supply 16. Since the resistance between probes 18 and 20 is very low compared to the internal resistance of the D. C. supply, the current flow through the meter is not changed by substituting the short circuit for the resistance between the probes. As a result, the meter retains its last measured reading indefinitely. Besides retaining this reading for future reference, it will be apparent that should a subsequent or repeated measurements be taken of substantially similar thickness components, the apparatus will be in substantial adjustment and the new measurement may be completed with but a minimum of motor movement. The latter permits exceptionally quick routine measurements.

It is apparent that the present invention provides a simple, accurate, and quick method and apparatus for non-destructively and automatically measuring the plating thickness of a specimen or component. Furthermore, it is seen that this apparatus provides a direct indication of the plating thickness which may be retained at will.

Obviously many variations of the present invention are possible in the light of the above teachings. It is therefore to be understood that within the scope of the appended claims, the invention may be practiced otherwise than as specifically described.

What is claimed is:

1. Apparatus for electrically determining the thickness of plating on a body comprising a first pair of probes adapted for contact with a surface of said plated body, electrical supply means connected with said probes establishing a first potential across a portion of said plated body, a second pair of probes adjacent said first probes for measuring said first potential, means connected with said second probes providing the same with a reference potential so as to cause a current flow in said plated body in opposition to current from said first probes, the difference in said potential being proportional to the plating thickness on said body, servo means responsive to the difference potential existing between said first and reference potentials, and connected to said first and reference potentials and said electrical supply means for automatically balancing current flow in said plated body, and indicating means calibrated in terms of thickness connected with said first probes.

2. Apparatus for determining plating thickness by measuring the conductance of a plated body comprising a first pair of probes in contact with said plated body, electrical means supplying said probes with a first current for establishing a potential drop in said plated body, a second pair of probes adjacent said first probes in contact with said plated body, means providing said second probes with a reference potential thereby furnishing said plated body with a second current flowing in opposition to said first current, the difference in said potentials being proportional to the plating thickness on said body, means responsive to the difference potential existing in said plated body and being associated with said electrical means for automatically adjusting said first current so as to balance the second current produced by said reference potential, and indicating means calibrated in thickness units corresponding to the conductivity of said plated body connected with said first probes and said electrical means.

3. Apparatus for measuring the thickness of conductive platings on a body by determining the difference in conductivity between the platings and said body comprising a pair of current probes adapted for contact with said body, a pair of potential probes adjacent said current probes, first and second electrical supply means respectively providing said current and potential probes with currents flowing in opposition in said body, means responsive to the difference potential developed by said currents, means connecting said responsive means with said first electrical supply for adjusting the latter so as to cause a current of sufficient magnitude to flow in said body to balance the potential established by said second electrical supply means, and a meter calibrated in terms of plating thickness corresponding to the conductance of said body connected with said first electrical means, whereby the amount of current necessary to achieve said balance in said body is directly readable on the meter in terms of plating thickness.

4. Apparatus for determining the thickness of plating on a base material by measuring the difference in electrical conductivity between the base and plated materials comprising a pair of current probes adapted for contact with said material, electrical means supplying a first current to said probes for establishing a potential drop in said material, a pair of potential probes adjacent said current probes for detecting said potential drop, second electrical means supplying a reference potential to said potential probes so as to cause a second current to flow in opposition to said first current, means connected with said potential probes responsive to the difference potential existing in said materials, adjusting means associated with said responsive means for varying the amount of current supplied to said current probes thereby establishing a potential balance in the system, and a meter calibrated in terms of thickness units corresponding to said base material inserted in circuit with said current probes for indicating the thickness of the plating material.

5. The combination according to claim 4 wherein said second electrical means includes a voltage regulator tube and a voltage reference tube.

6. The combination according to claim 4 wherein said means responsive to said difference potential comprises an amplifier in series with said potential probes, and a motor controlled by said amplifier for regulating said adjusting means so that the current flow through said current probes is automatically adjusted until the potential across said potential probes balances said reference potential.

7. The combination according to claim 4 wherein said means supplying said reference potential is connected through means controlling operation of a relay, and a motor controlled by said relay for regulating said adjusting means thereby controlling the supply of current to said current probes.

8. Apparatus for measuring the thickness of conductive platings on a body of known conductivity comprising a pair of current probes, a pair of potential probes, on a line with and between said current probes, said probes being in contact with said plated body, said current probes and said potential probes being spaced apart a distance greater than the plating thickness to be measured whereby the current flow in said plated body will be laminar, first means supplying a current to said current probes, second means supplying a reference current to said potential probes in opposition to the current flowing therein due to the potential drop across said potential probes, means for adjusting said first means to obtain a balance, and means responsive to said last-named means for indicating the current required to achieve said balance.

References Cited in the file of this patent

UNITED STATES PATENTS

| | | |
|---|---|---|
| Re. 21,853 | Atkinson | July 15, 1941 |
| 2,142,619 | Sciaky | Jan. 3, 1939 |
| 2,659,861 | Branson | Nov. 17, 1953 |

FOREIGN PATENTS

| | | |
|---|---|---|
| 285,536 | Germany | July 5, 1915 |